United States Patent [19]
Crawford

[11] Patent Number: 5,950,492
[45] Date of Patent: Sep. 14, 1999

[54] SHIFTER ASSEMBLY FOR USE WITHIN A VEHICLE TRANSMISSION

[75] Inventor: Paul Alexander Crawford, Medina, Ohio

[73] Assignee: MTD Products Inc, Cleveland, Ohio

[21] Appl. No.: 08/791,186

[22] Filed: Jan. 31, 1997

[51] Int. Cl.[6] .................................................. B60K 20/02
[52] U.S. Cl. .................. 74/473.3; 74/473.37; 192/48.91
[58] Field of Search .............. 74/473.27, 473.3, 74/473.37, 375; 192/48.91

[56] References Cited

U.S. PATENT DOCUMENTS

| | | | |
|---|---|---|---|
| Re. 25,458 | 10/1963 | Barth et al. ................................ | 74/331 |
| 1,705,269 | 3/1929 | Sechrist .................................... | 180/6.58 |
| 1,732,626 | 10/1929 | Wilson ...................................... | 180/6.6 |
| 1,768,645 | 7/1930 | Thomas et al. .......................... | 180/6.64 |
| 1,952,267 | 3/1934 | Lotte ......................................... | 192/99 |
| 2,081,846 | 5/1937 | Behrens .................................... | 74/360 |
| 2,307,857 | 1/1943 | Rodler ....................................... | 74/360 |
| 2,323,384 | 7/1943 | Eberhard ................................... | 74/342 |
| 2,485,867 | 10/1949 | Dore .......................................... | 74/360 |
| 2,669,880 | 2/1954 | Brock et al. .............................. | 74/360 |
| 2,869,382 | 1/1959 | Klecker et al. ............................ | 74/360 |
| 3,173,303 | 3/1965 | Galaniuk ................................... | 74/375 |
| 3,214,987 | 11/1965 | Schenck et al. ........................... | 74/331 |
| 3,859,870 | 1/1975 | Whateley ................................... | 74/745 |
| 4,000,662 | 1/1977 | Wolfe ........................................ | 74/331 |
| 4,094,206 | 6/1978 | Sogo et al. ................................. | 74/360 |
| 4,793,202 | 12/1988 | Okubo ....................................... | 74/477 |
| 5,404,772 | 4/1995 | Jester ........................................ | 74/606 |

*Primary Examiner*—Charles A. Marmor
*Assistant Examiner*—David Fenstermacher
*Attorney, Agent, or Firm*—Emerson & Associates; Roger D. Emerson; Timothy D. Bennett

[57] ABSTRACT

A shifter assembly for use within an associated vehicle transmission includes a shift shaft fixedly attached to the housing of the transmission, a drive shaft rotatively attached to the housing of the transmission and, first and second shift forks operatively connected to the shift shaft and operatively connected to the drive shaft. The shift forks have arms with slots for receiving a shift lever. To shift the associated vehicle transmission, a shift lever is shifted, moving the first shift fork along the shift shaft, sliding a first clutch collar along the drive shaft. Next, a second shift fork is moved along the shift shaft, sliding a second clutch collar along the drive shaft.

12 Claims, 6 Drawing Sheets

SHIFTER ASSEMBLY FOR USE WITHIN A VEHICLE TRANSMISSION

BACKGROUND OF THE INVENTION

1. Field of Invention

This invention pertains to the art of methods and apparatuses for use in vehicle transmissions, and more specifically to methods and apparatuses for use in shifting gears within the transmission of an off the road vehicle.

2. Description of the Related Art

It is well known to provide off the road vehicles, such as lawn and garden vehicles, with a transmission for use in transmitting power from the engine to the driving axle. Such transmissions typically have components, such as gears or sprockets, which must be selectively shifted into engagement or shifted into disengagement. It is known to use shift forks in making such shiftings.

A common problem encountered in the art deals with the complexity of transmissions. Typically each shift fork requires a separate shift shaft whereby it can be shifted. All such shift shafts require connecting means for connecting to the transmission housing and they typically need extra linkages in order to shift them.

Another problem encountered in the art is the weight of transmissions. Each shift shaft adds weight to the transmission. It is also common to require a larger transmission housing to hold the additional shift shafts. All such shafts and housing expansions add undesired extra weight to the transmission.

The present invention provides methods and apparatuses for reducing these problems. The difficulties inherent in the art are therefore overcome in a way which is simple and efficient, while providing better and more advantageous results.

SUMMARY OF THE INVENTION

In accordance with one aspect of the invention there is provided a shifter assembly for use within an associated vehicle transmission. The shifter assembly includes a shift shaft fixedly attached to the housing of the transmission, a drive shaft rotatively attached to the housing of the transmission and, first and second shift forks operatively connected to the shift shaft and to the drive shaft. The shift forks have arms with slots for receiving a shift lever.

In accordance with another aspect of the invention there is provided a method of selectively shifting a vehicle transmission. A shift lever is shifted, moving the first shift fork along the shift shaft. The shift fork in turn slides a first clutch collar along the drive shaft. Next, a second shift fork is moved along the shift shaft, sliding a second clutch collar along the drive shaft.

One advantage of the present invention is that it is relatively simple. Only one shift shaft is required and only two shift forks.

Another advantage of the present invention is that its weight is relatively light. By using only one shift shaft and not requiring additional linkages, weight is substantially reduced.

Another advantage of the present invention is that only one shift lever is required to shift both shift forks.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
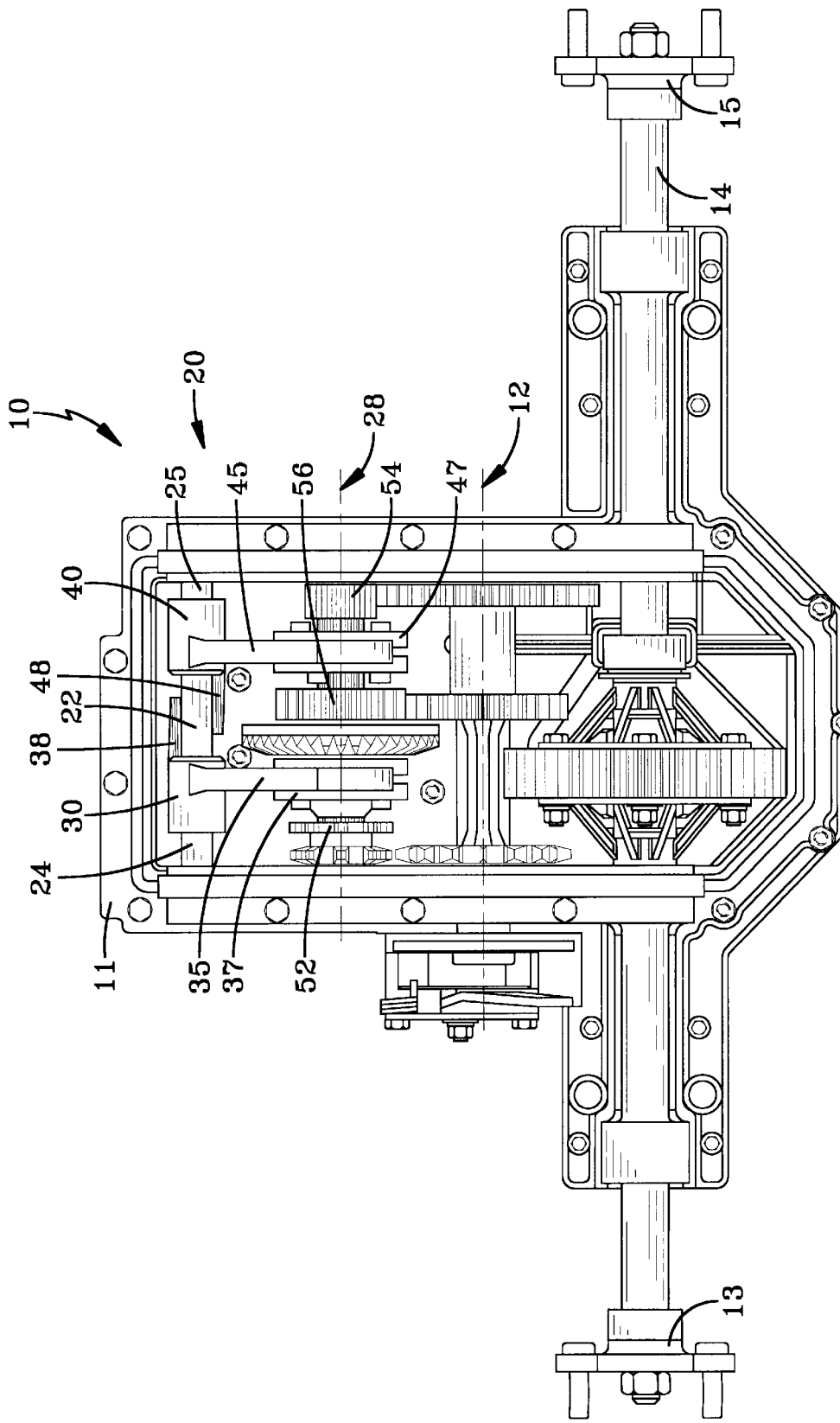
FIG. 1 is a top view of a two speed transmission using the shifter assembly of this invention.

Referring now to the drawings wherein the showings are for purposes of illustrating a preferred embodiment of the invention only and not for purposes of limiting the same, FIG. 1 shows a transmission 10 having a housing 11 which is equipped with the present invention, a shifter assembly 20. This embodiment includes a two speed transmission used on a riding lawn mower but the invention is applicable to other transmissions, other gearing devices, and other applications as well. The transmission 10 includes, an output shaft 12, and an driving axle 14 which carries left and right hub assemblies 13, 15 as viewed in FIG. 1. The purpose of the output shaft 12 and the driving axle 14 is as is commonly known in the art so their use will not be explained further.

Figure 2:
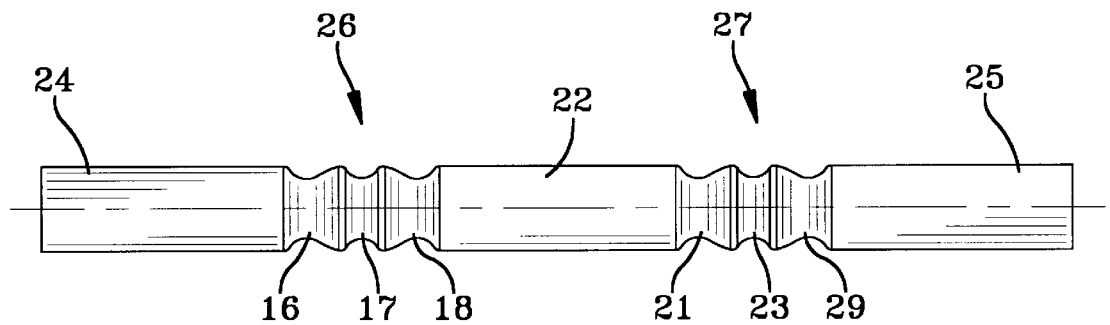
FIG. 2 is a side view of the shift shaft showing two sets of circumferential grooves.
Figure 3:
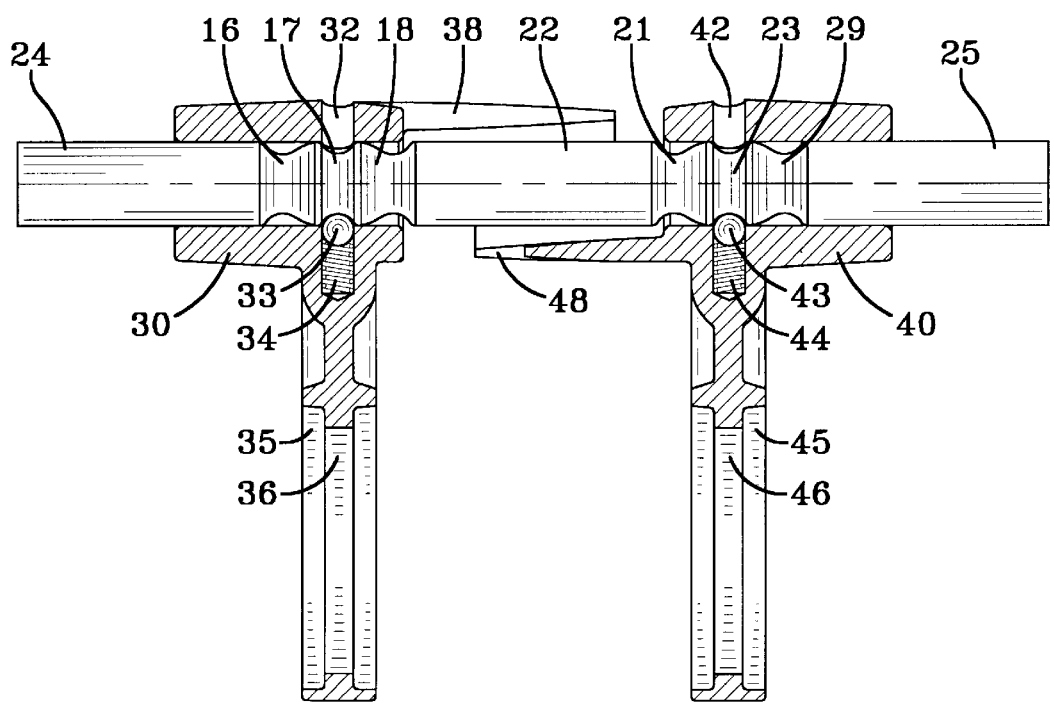
FIG. 3 is a cut-a-way top view of the shift forks mounted on the shift shaft illustrating the neutral position.

With reference now to FIGS. 1–3, the shifter assembly 20 includes a drive shaft 28 rotatably attached to the housing 11 by any bearing means commonly known in the art. The purpose of the drive shaft 28 is as is commonly known in the art and thus it will not be explained in full. The shifter assembly 20 also includes a shift shaft 22 having first and second ends 24 and 25 which is fixedly connected to the housing 11 by any means known in the art. The shift shaft 22 has first and second sets of grooves 26 and 27. In this preferred embodiment, each set of grooves 26, 27 has three circumferential grooves, 16, 17, 18 and 21, 23, 29 respectively but only two are necessary for the invention. The purpose for these grooves will be discussed below.

Figure 5:
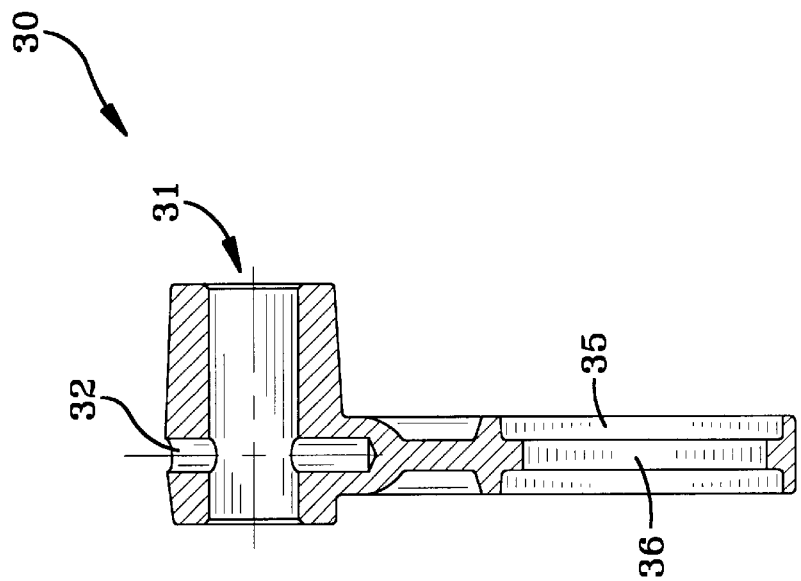
FIG. 5 is a sectional bottom view of the first shift fork taken along the line 5—5 of FIG. 4 showing the channel which receives a spring loaded ball detent.
Figure 4:
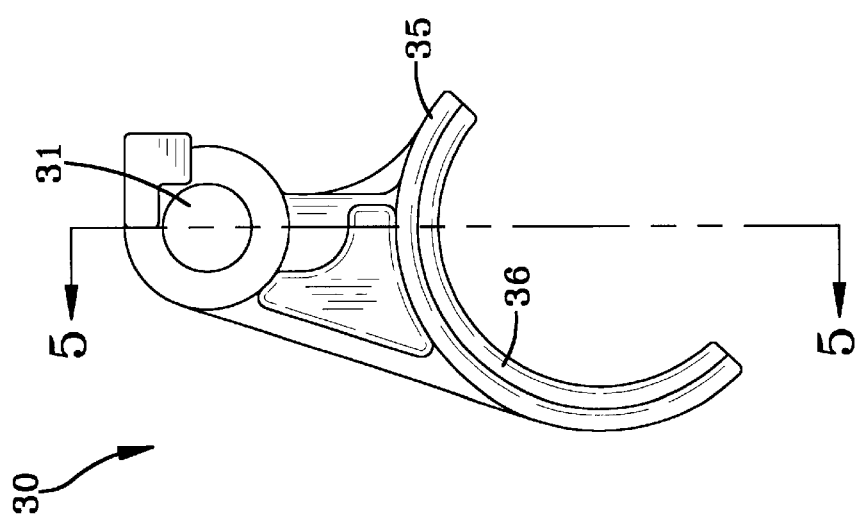
FIG. 4 is a side view of the first shift fork.
Figure 6:
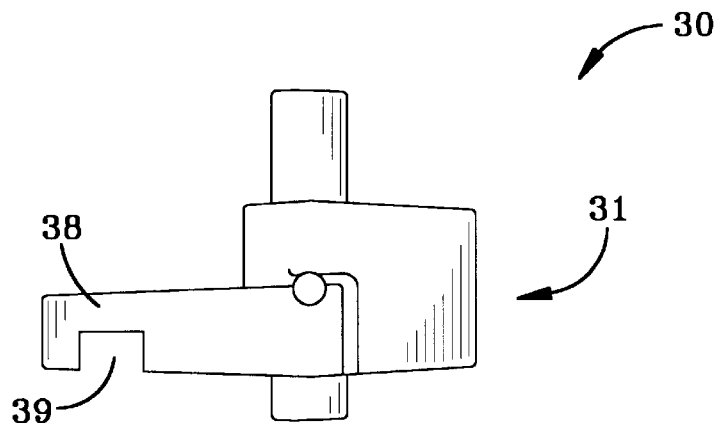
FIG. 6 is an end view of the first shift fork taken along the line 6—6 of FIG. 7.
Figure 8:
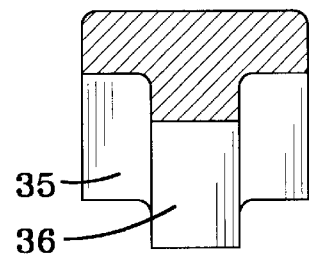
FIG. 8 is a close-up sectional view of the half-ring section of the first shift fork taken along the line 8—8 of FIG. 7 showing the rim used to connect with a clutch collar.
Figure 7:
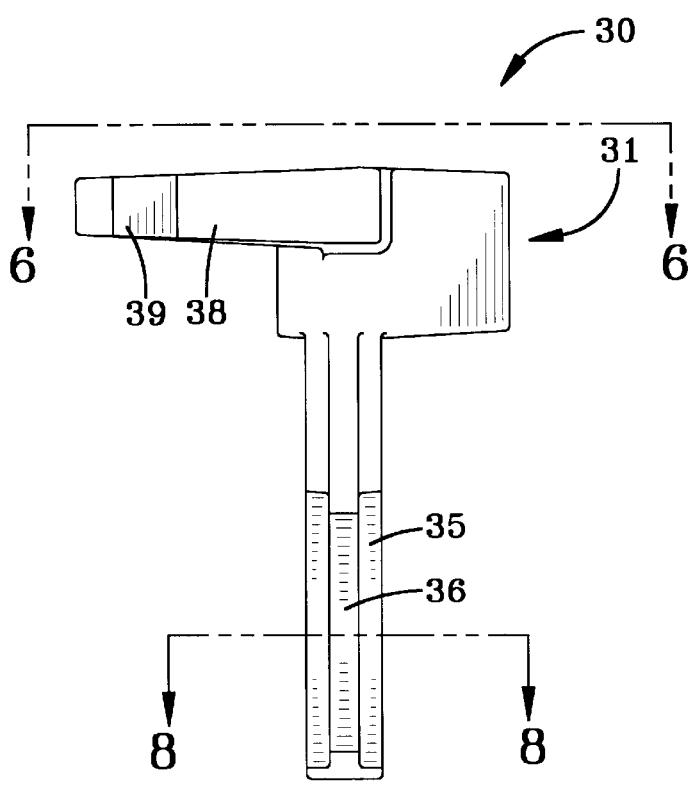
FIG. 7 is a bottom view of the first shift fork showing the slot which receives a shift lever.
Figure 10:
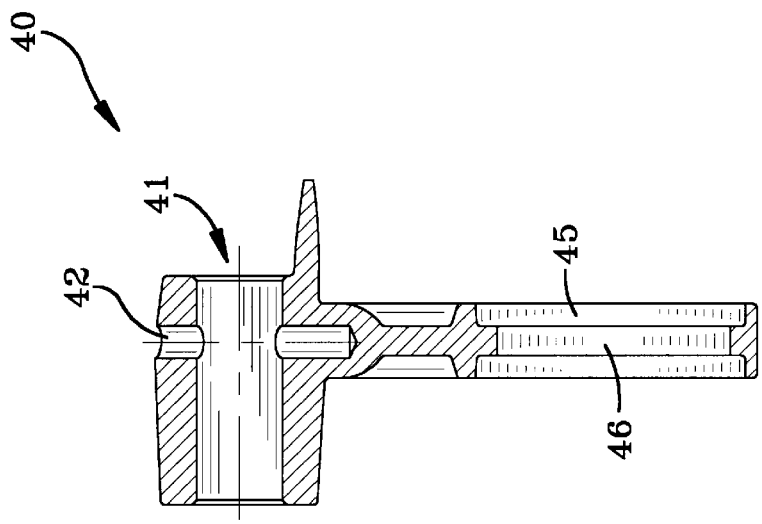
FIG. 10 is a sectional bottom view of the second shift fork taken along the line 10—10 of FIG. 9 showing the channel which receives a spring loaded ball detent.
Figure 9:
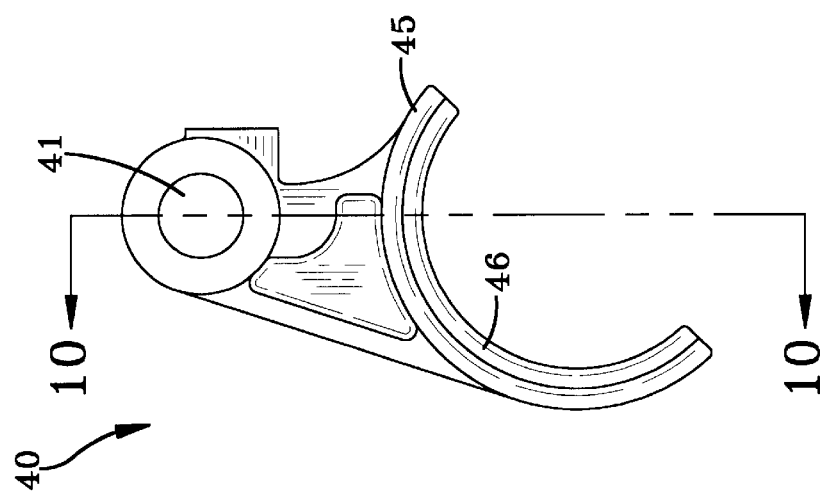
FIG. 9 is a side view of the second shift fork.
Figure 11:
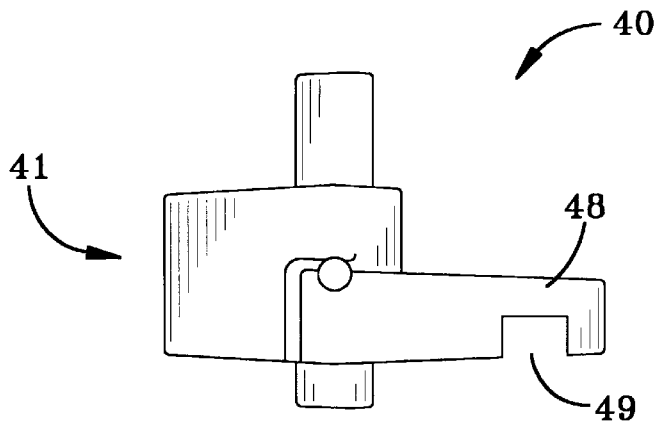
FIG. 11 is an end view of the second shift fork taken along the line 11—11 of FIG. 12.
Figure 13:
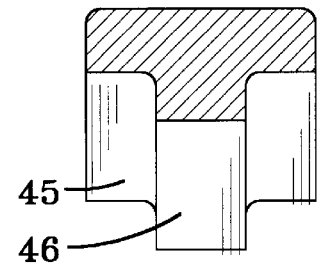
Figure 12:
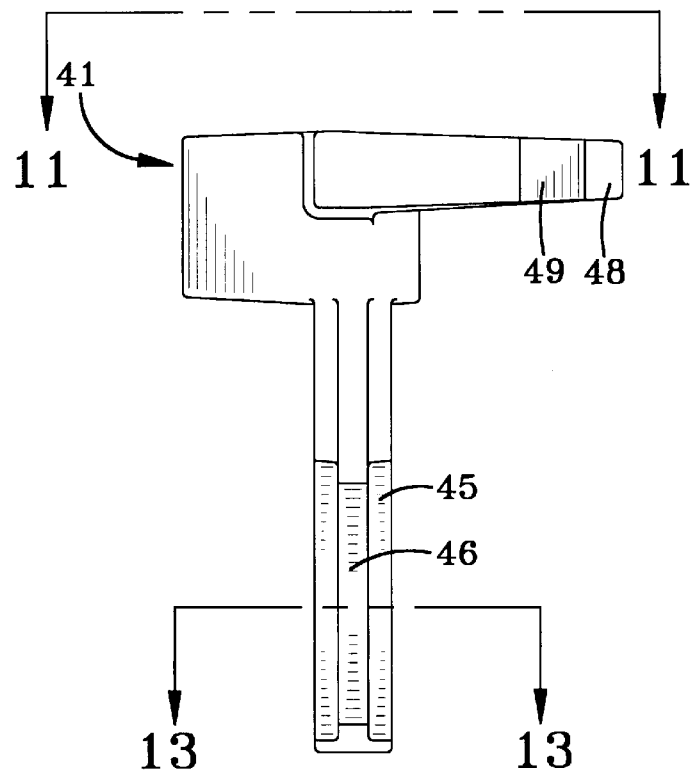
FIG. 12 is a bottom view of the second shift fork showing the slot which receives a shift lever; and, FIG. 13 is a close-up sectional view of the half-ring section of the second shift fork taken along the line 13—13 of FIG. 12 showing the rim used to connect with a clutch collar.

With reference to FIGS. 1–3, 5 and 10, the shifter assembly 20 also includes first and second shift forks, 30 and 40. The first and second shift forks 30, 40, have openings 31, 41 which receive the shift shaft 22. As is best seen in FIGS. 3, 5 and 10, in order to lock the first and second shift forks 30, 40, which are slidable along the length of shift shaft 22, into their appropriate positions, channels 32, 42 receive ball detents 33, 43 which are spring loaded by springs 34, 44 respectively. The springs 34, 44 are chosen with sound engineering judgement such that their spring rates allow the shift forks 30, 40 to be shifted along the length of shift shaft 22 but also hold the shift forks 30, 40 in position when they are not being shifted.

With reference now to FIGS. 1, 4–5, 7–8, 9–10 and 12–13, the first and second shift forks 30, 40 have half-ring sections 35, 45 which are semicircular. The half-ring sections 35, 45 have rims 36, 46 for fitting into clutch collars 37, 47 as is commonly known in the art. In this preferred embodiment, first shift fork 30 is connected to reverse clutch collar 37 and second shift fork 40 is connected to high-low clutch collar 47. The reverse and high-low clutch collars 37, 47 which can be of any type currently known in the art are slidably connected to the drive shaft 28.

With reference now to FIGS. 1, 3, 6–7, and 11–12, the first and second shift forks 30, 40 also have arms 38, 48 which have slots 39, 49 respectively for receiving a shift lever (not shown) which can be of any type known in the art. Arm 38 extends parallel to shift shaft 22 toward the second end 25 and arm 48 extends parallel to shift shaft 22 toward the first end 24 such that arms 38 and 48 overlap without coming into contact with each other. The overlapping of the arms 38, 48 brings the slots 39, 49 relatively close together so that the single shift lever (not shown) can be used to simultaneously slide first and second shift forks 30, 40 along the shift shaft 22.

The operation of the shifter assembly 20 will now be discussed. FIGS. 1–3, show the shifter assembly 20 arranged in a neutral position. By neutral position it is meant that neither the reverse clutch collar 37 nor the high-low clutch collar 47 is engaged with a sprocket or gear on the drive shaft 28. In this neutral position, the associated vehicle will not be propelled by the transmission 10 in any direction. This is illustrated in FIG. 3 where it can be seen that the first and second shift forks 30, 40 are positioned in the middle grooves 17, 23 respectively of the first and second sets of grooves 26, 27.

To shift the transmission into reverse from a neutral position, with continuing reference to FIGS. 1–3, the shift lever (not shown) would be shifted and the first shift fork 30 would be slidden along the shift shaft 22 toward first end 24 until it locked into circumferential groove 16. The second shift fork 40 would remain in circumferential groove 23. As the first shift fork 30 moves, it moves reverse clutch collar 37 in the same direction (toward first end 24) along drive shaft 28 until the reverse clutch collar 37 engages reverse sprocket 52 as is commonly known in the art. Thus the associated vehicle would be enabled to travel in reverse.

To shift the transmission into low from a reverse position, with reference to FIGS. 1–3, the shift lever (not shown) would be shifted and the first shift fork 30 would be sudden along the shift shaft 22 toward second end 25 until it locked into circumferential groove 17. The second shift fork 40 would be slidden along the shift shaft 22 toward second end 25 until it locked into circumferential groove 29. As the first shift fork 30 moves, it moves reverse clutch collar 37 in the same direction (toward second end 25) along drive shaft 28 until the reverse clutch collar 37 dis-engages from reverse sprocket 52 as is commonly known in the art. As the second shift fork 40 moves, it moves high-low clutch collar 47 in the same direction (toward second end 25) along drive shaft 28 until the high-low clutch collar 47 engaged low gear 54 as is commonly known in the art. Thus the associated vehicle would be enabled to travel in low gear.

To shift the transmission into high gear from low gear, with continuing reference to FIGS. 1–3, the shift lever (not shown) would be shifted and the first shift fork 30 would remain locked into circumferential groove 17. The second shift fork 40 would be slidden along the shift shaft 22 toward first end 24, past circumferential groove 23 until it locked into circumferential groove 21. As the second shift fork 40 moves, it moves high-low clutch collar 47 in the same direction (toward first end 24) along drive shaft 28. The high-low clutch collar 47 would dis-engaged from low gear 54 then engage high gear 56 as is commonly known in the art. Thus the associated vehicle would be enabled to travel in high gear.

Other transmission shiftings, such as from neutral position to low gear, could also be made. All such shiftings would be made in similar manner to that described above.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A shifter assembly for use within an associated vehicle transmission, the associated transmission having a housing, the shifter assembly comprising:

a shift shaft, said shift shaft being fixedly attached to the housing of the associated transmission, said shift shaft including a first set of grooves having first and second circumferential grooves, and a second set of grooves having first and second circumferential grooves;

a drive shaft, said drive shaft being rotatively attached to the housing of the associated transmission; and, first and second shift forks, said first and second shift forks being operatively connected to said shift shaft and said drive shaft, said first and second shift forks being selectively slidable along said shift shaft, said first set of grooves for selectively receiving said first shift fork and said second set of grooves for selectively receiving said second shift fork.

2. The shifter assembly of claim 1 further comprising:

first and second ball detents; and, first and second springs, said first ball and first spring for selectively holding said first shift fork within said first circumferential groove of said first set of grooves, said first ball and first spring also for selectively holding said first shift fork within said second circumferential groove of said first set of grooves, said second ball and second spring for selectively holding said second shift fork within said first circumferential groove of said second set of grooves, said second ball and second spring also for selectively holding said second shift fork within said second circumferential groove of said second set of grooves.

3. The shifter assembly of claim 1 wherein said first and second sets of grooves each have exactly three circumferential grooves.

4. A shifter assembly for use within an associated vehicle transmission, the associated transmission having a housing, the shifter assembly comprising:

a shift shaft, said shift shaft fixedly attached to the housing of the associated transmission;

a drive shaft, said drive shaft rotatively attached to the housing of the associated transmission; and, first and second shift forks, said first and second shift forks operatively connected to said shift shaft and said drive shaft, said first and second shift forks being selectively shiftable by an associated shift lever, said first and second shift forks having arms with slots for receiving the associated shift lever.

5. The shifter assembly of claim 4 wherein said arms extend parallel to said shift shaft.

6. The shifter assembly of claim 5 wherein said shift shaft has first and second ends, said arm of said first shift fork extending toward the second end of said shift shaft, said arm of said second shift fork extending toward the first end of said shift shaft, said arms overlapping.

7. The shifter assembly of claim 6 wherein the associated vehicle transmission has within only two shift forks.

8. A method of selectively shifting a vehicle transmission, the method using a shifter assembly which has a fixed shift shaft, a drive shaft, and first and second shift forks operatively connected to the shift shaft and the drive shaft, the method comprising the steps of:

shifting a shift lever;

moving the first shift fork along the fixed shift shaft;

locking the first shift fork into a circumferential groove on the fixed shift shaft;

sliding a first clutch collar along the drive shaft; and, maintaining a second shift fork in a locked position on the fixed shift shaft.

9. A method of selectively shifting a vehicle transmission, the method using a shifter assembly which has a fixed shift shaft, a drive shaft, and first and second shift forks operatively connected to the shift shaft and the drive shaft, the method comprising the steps of:

shifting a shift lever;

moving the first shift fork along the fixed shift shaft;

locking the first shift fork into a circumferential groove on the fixed shift shaft;

sliding a first clutch collar along the drive shaft;

moving the second shift fork along the fixed shift shaft; and, sliding a second clutch collar along the drive shaft.

10. The method of claim 9 after the step of moving the second shift fork along the fixed shift shaft having the step of:

locking the second shift fork into a circumferential groove on the fixed shift shaft.

11. A shifter assembly for use with an associated vehicle transmission, comprising:

a shift shaft that has a first circumferential groove, said shift shaft having first and second sets of grooves, said first set of grooves having at least two grooves including said first groove, said second set of grooves having at least two grooves including a second groove, said first set of grooves for selectively receiving a first shift fork, said second set of grooves for selectively receiving a second shift fork;

said first shift fork being selectively slidable along said shift shaft, said first circumferential groove selectively receiving said first shift fork; and, said second shift fork being selectively slidable along said shift shaft said second circumferential groove selectively receiving said second shift fork.

12. The shifter assembly of claim 11 wherein said first and second sets of grooves each have three grooves.

\* \* \* \* \*